(12) United States Patent
Hsu

(10) Patent No.: US 7,154,648 B2
(45) Date of Patent: Dec. 26, 2006

(54) APPARATUS AND METHOD FOR FABRICATING HOLOGRAM

(75) Inventor: Chien-Chiang Hsu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 106 days.

(21) Appl. No.: 11/104,932

(22) Filed: Apr. 13, 2005

(65) Prior Publication Data

US 2005/0225818 A1    Oct. 13, 2005

(30) Foreign Application Priority Data

Apr. 13, 2004   (TW) ............................... 93110242 A

(51) Int. Cl.
 *G03H 1/02*   (2006.01)
(52) U.S. Cl. .................... 359/35; 359/31; 359/900; 430/1; 355/54
(58) Field of Classification Search ............ 359/35, 359/30, 31, 900; 430/1, 2; 355/54
See application file for complete search history.

(56) References Cited

U.S. PATENT DOCUMENTS

| | | | |
|---|---|---|---|
| 6,185,019 B1 * | 2/2001 | Hobbs et al. .................. | 359/30 |
| 6,897,944 B1 * | 5/2005 | Shiozawa ..................... | 355/71 |
| 2005/0190350 A1 * | 9/2005 | Shinoda ........................ | 355/53 |
| 2006/0152700 A1 * | 7/2006 | Yamada ........................ | 355/55 |

* cited by examiner

*Primary Examiner*—Fayez G. Assaf
(74) *Attorney, Agent, or Firm*—Ladas & ParryLLP

(57) ABSTRACT

A hologram fabricating apparatus includes a coherent light generator, two micro-display devices and a telecentric system. The coherent light generator provides a first coherent light and a second coherent light. Each micro-display device has a plurality of pixel elements laid thereon. The first coherent light and the second coherent light project respectively to the two micro-display devices. The telecentric system is located between the micro-display devices and a photoresist sheet to converge the projecting light on the photoresist sheet to generate interference stripes. Each pixel element may be adjusted independently to determine whether the first coherent light and the second coherent light projected to the pixel element to be projected to the telecentric system.

12 Claims, 6 Drawing Sheets

APPARATUS AND METHOD FOR FABRICATING HOLOGRAM

BACKGROUND OF THE INVENTION

(1) Field of the Invention

The invention relates to an apparatus and a method for fabricating hologram, and more particularly to an apparatus and a method that fabricate hologram by controlling exposing position of the hologram through a micro-display device.

(2) Description of the Prior Art

Digital holography technology is a technique based on computer technologies, laser holographic techniques, digital image processing techniques, precision optical control techniques and laser optical fabrication techniques. Through the digital holography technology, a novel picture may be produced that is radically different from the conventional printing pictures. It can generate a new type of picture with dynamic spatial variations. These new type of pictures have a great impact to packaging materials and printing industry. It has a great industrial application potential and commercial value.

Referring to FIG. 1 for a typical digital hologram lithographic system 100. It includes a coherent light source 120, a light splitting unit 140, a telecentric system 160 and a photoresist sheet holding station 180. The coherent light source 120 (such as a laser light) generates a coherent light C0 which is refracted and reflected by the light splitting unit 140 to become a first coherent light C1 and a second coherent light C2 that are parallel with each other. The two coherent lights C1 and C2 project to the telecentric system 160, and are converged on the photoresist sheet holding station 180. When a photoresist sheet 200 is mounted onto the photoresist sheet holding station 180, due to the two coherent lights C1 and C2 have the same frequency, the interference stripes being generated do not change with time. Hence a steady exposed pattern may be provided by transferring the interference stripes accurately to the photoresist sheet 200.

As shown in FIG. 1, the light splitting unit 140 includes a light splitter 142 and a reflector 144. After the coherent light C0 projects to the light splitter 142, a portion of the light is reflected by the light splitter 142 and the rest of the light passes through the light splitter 142 to become the first coherent light C1 and the second coherent light C2 of different travel directions. The first coherent light C1 directly projects to the telecentric system 160, while the second coherent light C2 is reflected by the reflector 144 and projects to the telecentric system 160.

In the single lithographic process, the digital hologram lithographic system 100 processes exposure for merely one pixel of the photoresist sheet 200. To fabricate the entire hologram, the photoresist sheet 200 on the photoresist sheet holding station 180 must be moved to position every pixel of the photoresist sheet 200 individually for exposing.

Hence the time to finish the hologram lithographic process includes the exposing time of the photoresist sheet 200 and the time required to move the photoresist sheet holding station 180 to position the photoresist sheet 200. The time for exposing the photoresist sheet 200 is determined by the intensity of the coherent light source 120 and light absorption amount of the light splitting unit 140 and the telecentric system 160. Namely, the greater the energy of the coherent light source 120, the lower the light absorption amount of the light splitting unit 140 and the telecentric system 160 becomes, the light energy receiving amount on each unit area of the photoresist sheet 200 is greater, and the exposing time needed is shorter.

On the other hand, the time required to move the photoresist sheet holding station 180 to position the photoresist sheet 200 is determined by each time the photoresist sheet holding station 180 is moved to position the photoresist sheet 200 and the moving times. In general, when the photoresist sheet holding station 180 is moved to position the photoresist sheet 200 to a next spot, it is not stabilized instantly. Instead, it has to experience a short period of damping before stabilizing to process the next exposing. Moreover, a hologram of a VGA specification usually has 640×480 pixels. Hence the photoresist sheet holding station 180 has to be moved more than 300,000 times to finish the fabrication of the hologram. As a result, a great portion of the fabrication time is spent on positioning the photoresist sheet 200.

Therefore, how to shorten the time of processing hologram lithography and reduce the processing cost and improve fabrication speed are important issues in the application of the holographic technology.

SUMMARY OF THE INVENTION

Accordingly, it is an object of the present invention to provide an apparatus and a method to shorten the time required for processing hologram lithography to improve competitiveness of the holographic technology and enhance the commercial value of hologram.

In one aspect, the hologram fabricating apparatus according to the invention aims to shorten the time required in the hologram lithographic process by reducing the time of moving the photoresist sheet holding station to position the photoresist sheet in the lithographic process.

In another aspect, the hologram fabricating apparatus according to the invention includes a coherent light generator, two micro-display devices, and a telecentric system to fabricate interference stripes on a photoresist sheet to form the hologram. The coherent light generator provides a first coherent light and a second coherent light. The two micro-display devices have respectively a plurality of pixel elements laid thereon. The first coherent light and the second coherent light project respectively to the two micro-display devices. The telecentric system is located between the micro-display devices and the photoresist sheet to converge the incident light on the photoresist sheet to generate interference stripes. Moreover, each pixel element may be adjusted independently to determine whether the first coherent light and the second coherent light projected to the pixel element to be entered the telecentric system.

In an embodiment of the invention, two spatial filters are located respectively between the coherent light generator and the two micro-display devices to enable the first coherent light and the second coherent light to evenly project to the two micro-display devices.

In another embodiment of the invention, the micro-display device is a typical LCD panel. By adjusting the light transmission of each pixel element on the LCD panel, whether the first coherent light and the second coherent light projected to the pixel element to be transmitted and entered the telecentric system may be determined.

In yet another embodiment of the invention, the micro-display device is a Digital Micromirror Device (DMD). By adjusting the tilting angle of each micromirror of the DMD, whether the first coherent light and the second coherent light projected to the micromirror to be reflected and entered the telecentric system may be determined.

BRIEF DESCRIPTION OF THE DRAWINGS

The present invention will now be specified with reference to its preferred embodiment illustrated in the drawings, in which.

DESCRIPTION OF THE EMBODIMENTS

Figure 2:
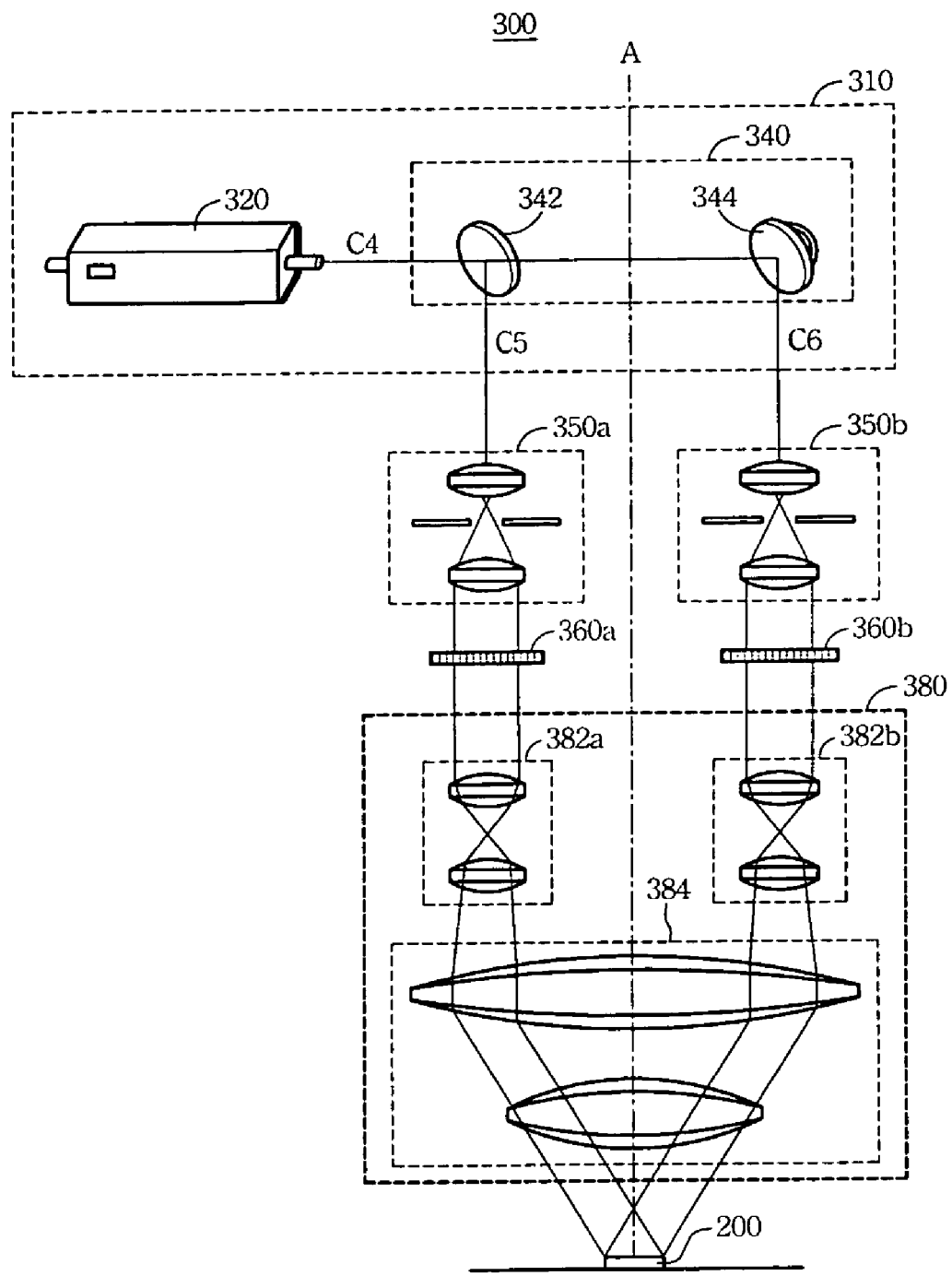
FIG. 2 is a schematic view of an embodiment of the hologram fabricating apparatus of the invention.

Refer to FIG. 2 for an embodiment of a hologram fabricating apparatus 300 of the invention. It includes a coherent light generator 310, two micro-display devices 360a and 360b, and a telecentric system 380 to fabricate interference stripes on a photoresist sheet 200 to form a hologram. The purpose of selecting a coherent light is to form a stable interference stripes without varying with time to effectively expose the photoresist sheet 200. The coherent light generator 310 provides a first coherent light C5 and a second coherent light C6 that project respectively to the two micro-display devices 360a and 360b. The telecentric system 380 is located between the micro-display devices 360a and 360b and the photoresist sheet 200 to converge the entering coherent light on the photoresist sheet 200 to generate the interference stripes.

The coherent light generator 310 includes a coherent light source 320 and a light splitting unit 340. The light splitting unit 340 includes a light splitter 342 and a mirror 344. The coherent light source 320 provides a coherent light C4 projecting to the light splitter 342. A portion of the coherent light C4 is reflected by the light splitter 342 to form the first coherent light C5 leaving the light splitting unit 340. The rest portion of the coherent light C4 penetrates the light splitter 342 and is reflected by the mirror 344 to form the second coherent light C6 leaving the light splitting unit 340. In one embodiment, the light splitter 342 and the mirror 344 are parallel with each other so that the first coherent light C5 and the second coherent light C6 are substantially parallel with each other.

Figure 3:
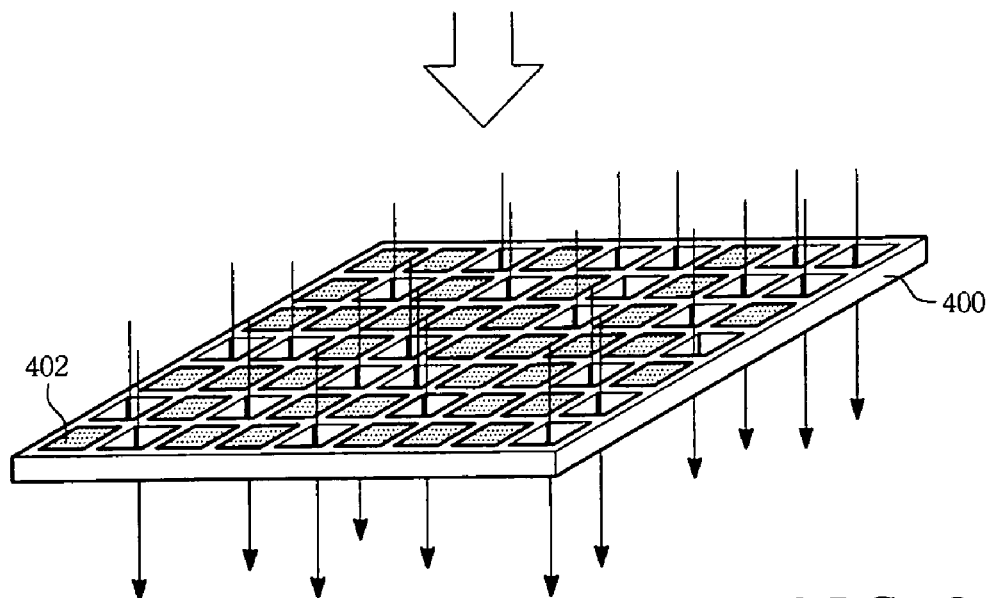
FIG. 3 is schematic view of an embodiment of the micro-display device of the invention.
Figure 4A:
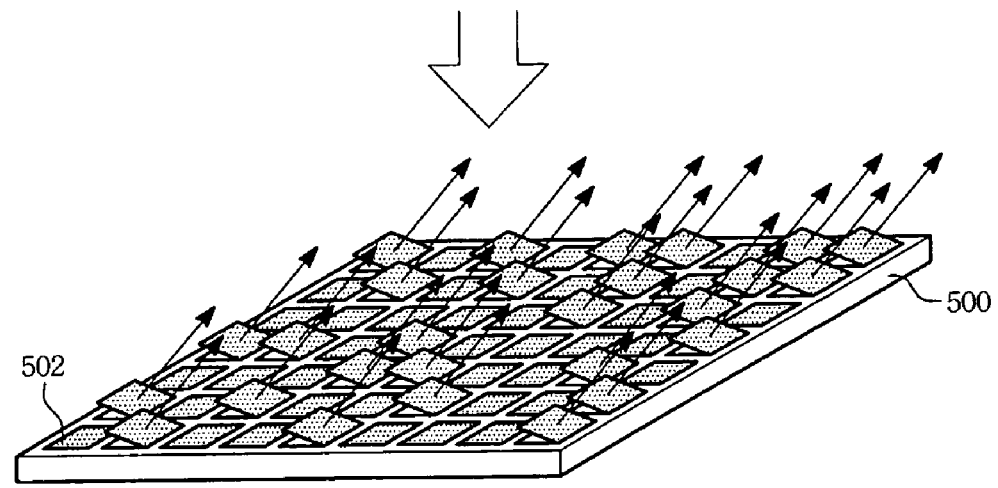
FIG. 4A is a schematic view of another embodiment of the micro-display device of the invention.
Figure 4B:
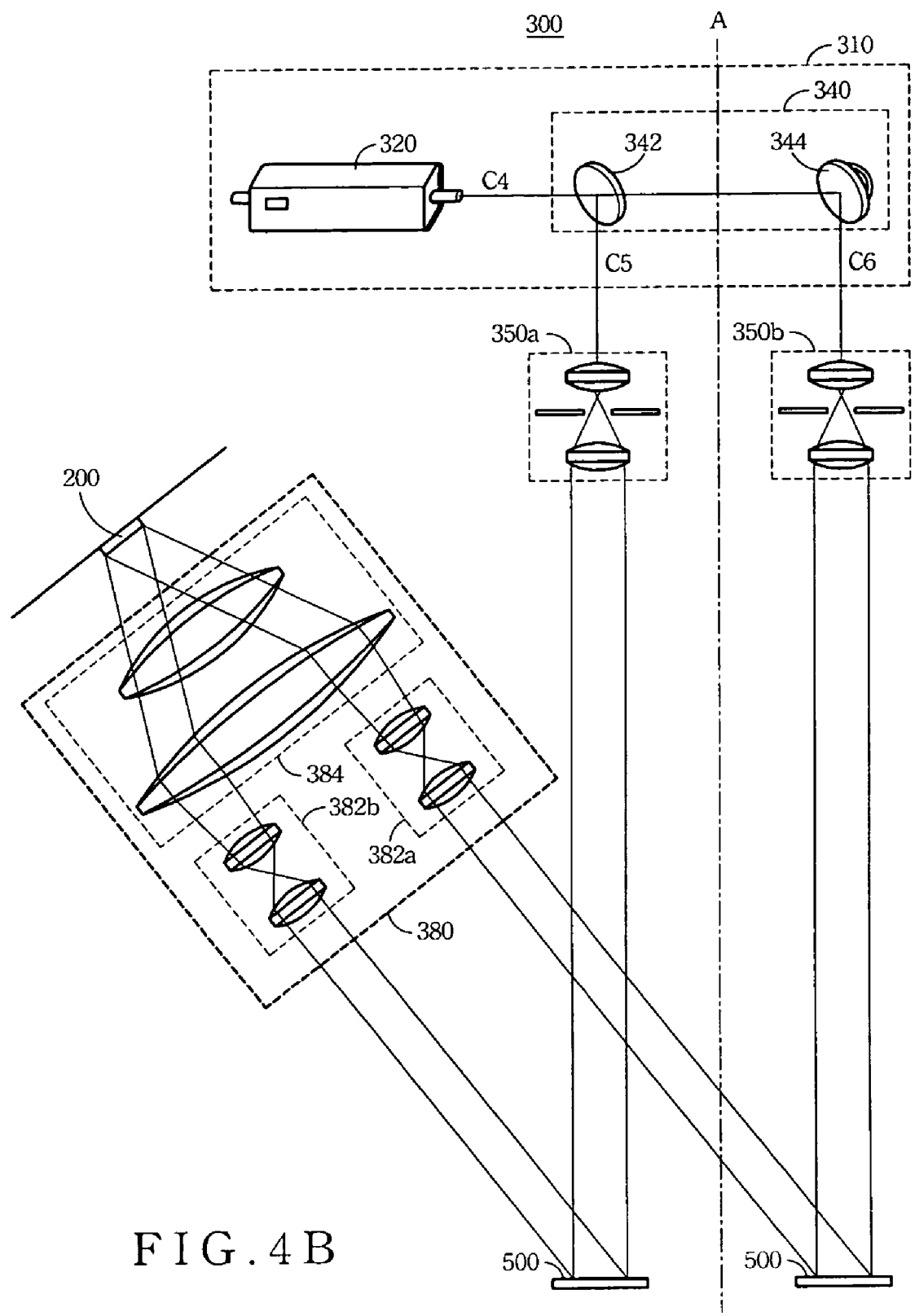
FIG. 4B a schematic view of another embodiment of the hologram fabricating apparatus of the invention that adopts the micro-display device shown in FIG. 4A.

Each micro-display device 360 has a plurality of pixel elements laid thereon, and each pixel element corresponds to a pixel on the photoresist sheet 200. By adjusting each pixel element of the micro-display device 360, the location of the pixels on the photoresist sheet 200 to be exposed may be determined. In one embodiment of the invention, referring to FIG. 3, the micro-display device is a typical LCD panel 400. By adjusting the light transmission of each pixel element 402 of the LCD panel 400, whether the first coherent light C5 and the second coherent light C6 projected to the pixel element 402 to be transmitted to the telecentric system 380 may be determined. In addition, referring to FIGS. 4A and 4B, the micro-display device may also be a DMD 500. By adjusting the tilting angle of each micromirror 502 on the DMD 500, whether the first coherent light C5 and the second coherent light C6 projected to the micromirror 502 to be reflected to the telecentric system 380 may be determined.

As previously discussed, through the arrangement of the micro-display device 360, a portion of the first coherent light C5 and the second coherent light C6 project into the telecentric system 380. To enable the light entering the telecentric system 380 to be converged on the photoresist sheet 200 and generate interference stripes, referring to FIG. 2, the telecentric system 380 includes two front stage lenses 382a and 382b and a rear stage lens 384. The front stage lenses 382a and 382b are located respectively on the rear ends of the two micro-display devices 360a and 360b to focus the first coherent light C5 and the second coherent light C6 projecting into the telecentric system 380 on a focus plane (not shown in the drawings). The rear stage lens 384 is located between the focus plane and the photoresist sheet 200 to transform the first coherent light C5 and the second coherent light C6 focused on the focus plane to parallel light and re-converge and focus on the photoresist sheet 200 to generate the interference stripes.

Figure 5:
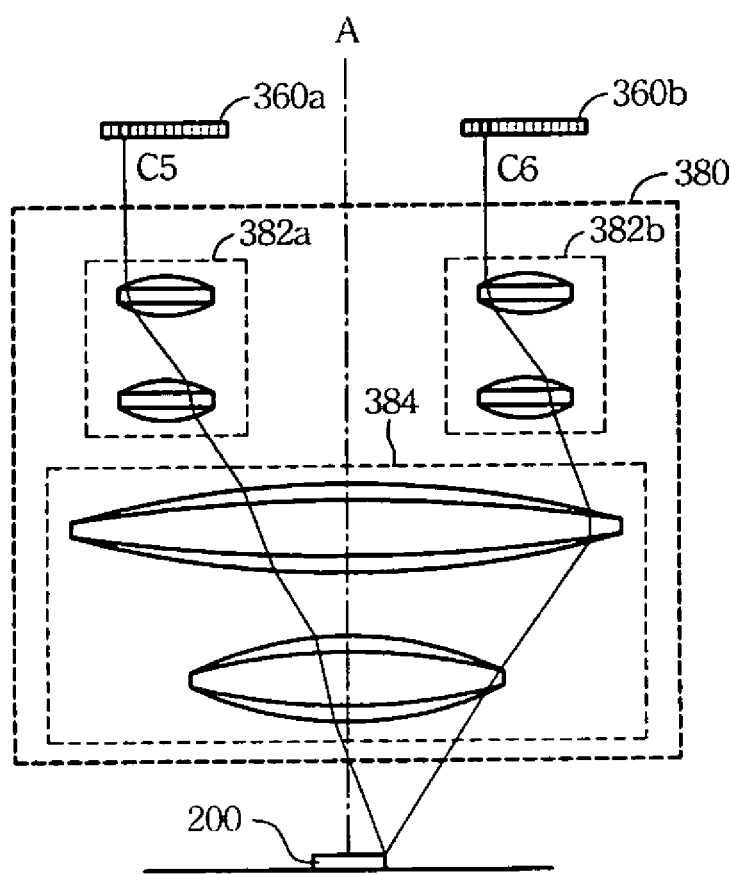
FIG. 5 is a schematic view of the micro-display device of the invention in an operating condition.

Referring to FIG. 5, the interference stripes are formed by the first coherent light C5 and the second coherent light C6. Hence the pixel elements of the two micro-display devices 360a and 360b must operate synchronously. Namely, the pixel elements on the same locations of the two micro-display devices 360a and 360b must have identical operation mode, so that the portions of the first coherent light C5 and the second coherent light C6 processed by the micro-display devices 360a and 360b are illuminated on the same surface portion on the photoresist sheet to ensure that the interference stripes are formed as desired.

In order to achieve clear interference stripes on each pixel location of the photoresist sheet 20, each pixel element of the micro-display device 360 must receive adequate light projection. Hence, referring to FIG. 2, two spatial filters 350a and 350b are provided and located respectively between the coherent light generator 320 and the two micro-display devices 360a and 360b. They aim to enable the first coherent light C5 and the second coherent light C6 to evenly project to the micro-display devices 360a and 360b to avoid too much variation of projecting light intensity illuminated to different pixel locations of the photoresist sheet 200 to result in making too much difference of the demanded exposure time.

Furthermore, in order to provide most clear interference stripes and shorten the exposure time, another embodiment is to direct the axes of the two micro-display devices 360a and 360b symmetrically in the direction of the central axis A of the telecentric system 380. Thereby, the length of the optical paths of the first coherent light C5 and the second coherent light C6 from the micro-display devices 360a and 360b to the photoresist sheet 200 respectively are the same. In addition, the first coherent light C5 and the second coherent light C6 also provide the same illumination on the photoresist sheet 200.

Figure 6A:
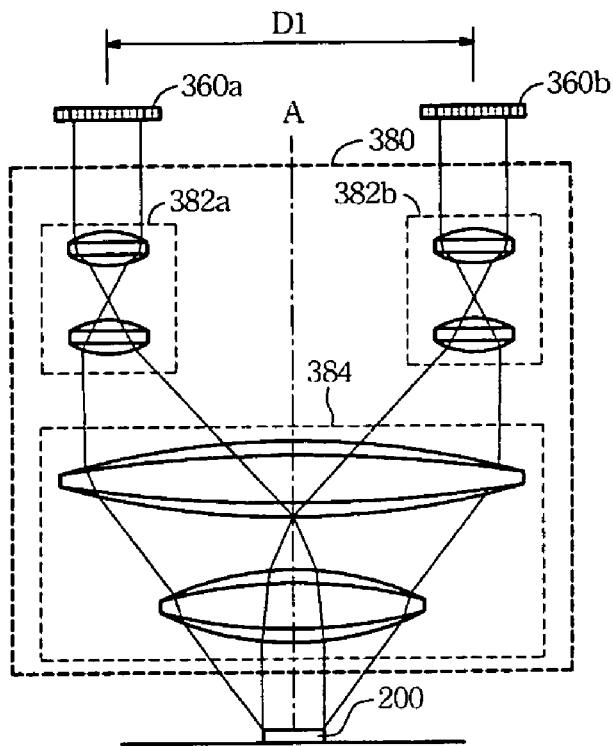
FIGS. 6A and 6B are schematic views of the hologram fabricating apparatus of the invention with the intervals of the two micro-display device adjusted to alter the interference stripes.
Figure 6B:
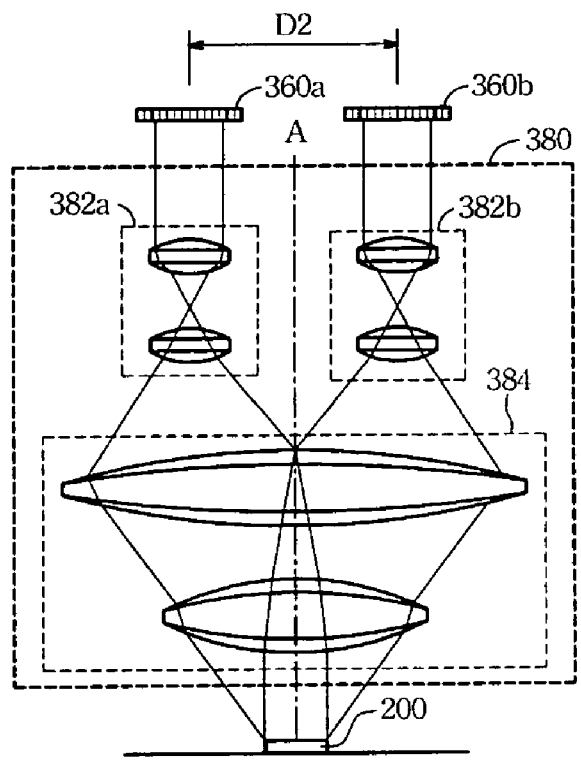

In addition, for controlling the distance between the micro-display devices 360a and 360b to adjust the density of the interference stripes on the photoresist sheet 200, referring to FIGS. 6A and 6B, a linear sliding track (not shown in the drawings) may be formed between the two micro-display devices 360a and 360b so that the two micro-display devices 360a and 360b as well as the front stage lenses 382a and 382*b* may be moved along the sliding track so as to adjust the intervals D1 and D2 therebetween. It is noted that, when adjusting the distance between the two micro-display devices 360*a* and 360*b*, the central axis A of the telecentric system 380 is regarded as a symmetric center. That is, the distances between the two micro-display devices 360*a* and 360*b* and the central axis A are varied respectively and concurrently to get the clearest interference stripes.

By means of the hologram fabricating apparatus 300 shown in FIG. 2, the hologram lithographic process may be simplified as follow:

1. First, group the pixels to be formed on the photoresist sheet 200 based on the designed direction and interval of the interference stripes of the pixels, namely, the pixels that have the same direction and interval of the interference stripes are sorted in the same group.
2. Next, based on the grouping result, adjust the two micro-display devices 360*a* and 360*b* corresponding to the pixel elements of the same group simultaneously, so that the coherent light projecting to these pixel elements can project to the telecentric system 380.
3. Afterward, according to the pixel data of the pixels in the same group, namely the direction and interval of the interference stripes, adjust the interval of the two micro-display devices 360*a* and 360*b* and the rotational angle relative to the direction of the central axis A, which is perpendicular to the photoresist sheet.
4. Finally, activate the exposing light source to generate the first coherent light C5 and the second coherent light C6 to expose the photoresist sheet 200, and record the interference stripes of this group of pixels on the photoresist sheet 200 in one exposing step.
5. Repeat the steps 1 through 4 to expose the pixels of different groups until the entire hologram is finished.

Figure 1:
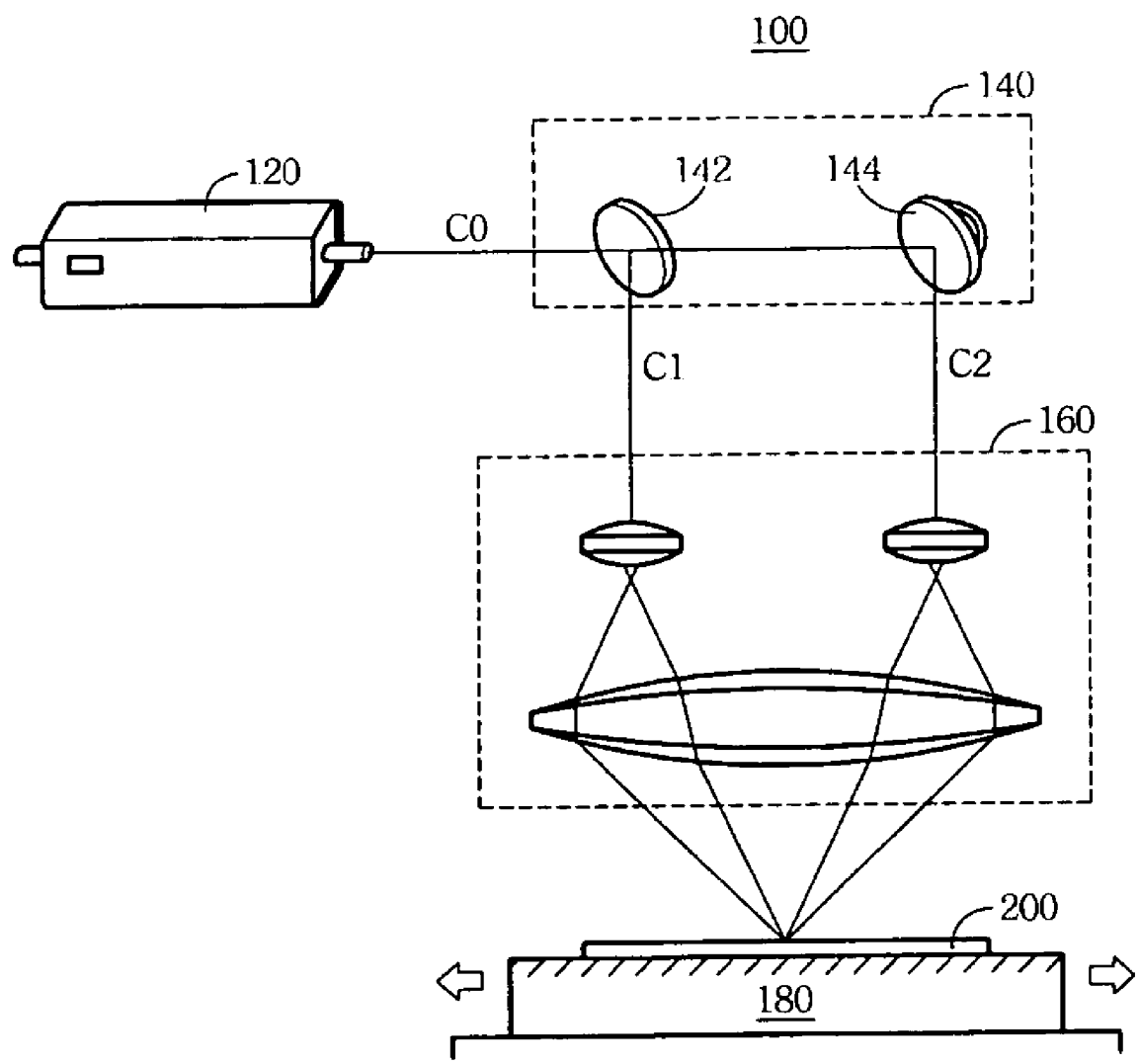
FIG. 1 is a schematic view of a conventional hologram lithographic system.

Compared with the conventional hologram lithographic system 100, the hologram fabricating apparatus 300 of the invention has the following advantages:

1. The conventional hologram lithographic system 100 exposes a single pixel of the photoresist sheet 200 in one lithographic step. The number of exposing required to finish the hologram equals the entire pixel number. By contrast, the hologram fabricating apparatus 300 of the invention groups the pixel data of the hologram in advance, and the pixels of the same group are exposed in one exposing step. Hence the required exposing time may be reduce greatly, and the fabrication process is simplified.
2. As shown in FIG. 1, in the conventional hologram lithographic system 100, the photoresist holding station 180 must position the photoresist sheet 200 before each exposing. With the increasing of the complication of the hologram, the times to position the photoresist sheet must increase significantly. By contrast, the hologram fabricating apparatus 300 of the invention defines the exposing position through the micro-display device 360. Therefore, the time needed for positioning the exposing pixels is shortened. In addition, in the invention, the pixels of the same group are exposed at the same time. The times of positioning exposing pixels required to finish the hologram are also reduced greatly. Hence the time cost required to fabricate the hologram is decreased, and the competitiveness of the hologram is strengthened.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

I claim:

1. A hologram fabricating apparatus for fabricating interference stripes on a photoresist sheet to produce a hologram, comprising:
   a coherent light generator to provide a first coherent light and a second coherent light;
   two micro-display devices having respectively a plurality of pixel elements laid thereon, and the first coherent light and the second coherent light projecting to the two micro-display devices, respectively; and
   a telecentric system located between the micro-display devices and the photoresist sheet to converge the projecting coherent light on the photoresist sheet and generate the interference stripes;
   wherein the pixel elements are adjustable individually to determine whether the first coherent light and the second coherent light projected to the pixel elements to be entered the telecentric system.

2. The hologram fabricating apparatus of claim 1, wherein the micro-display is a micromirror, the tilting angle of the micromirror being adjustable to determine whether the first coherent light and the second coherent light projected to the pixel element to be entered the telecentric system.

3. The hologram fabricating apparatus of claim 1, wherein the micro-display contains a LCD layer, the light transmission of the LCD layer being adjustable to determine whether the first coherent light and the second coherent light projected to the pixel element to be entered the telecentric system.

4. The hologram fabricating apparatus of claim 1, wherein the coherent light generator includes a coherent light source and a light splitting unit, the coherent light source generating light which projects to the light splitting unit to be divided into the first coherent light and the second coherent light.

5. The hologram fabricating apparatus of claim 4, wherein the light splitting unit includes a light splitter and a mirror, the light generated by the coherent light source having a portion reflected by light splitter to form the first coherent light, and another portion transmitting the light splitter and reflected by the mirror to form the second coherent light, and the first coherent light being substantially parallel with the second coherent light.

6. The hologram fabricating apparatus of claim 1, wherein the telecentric system includes two front stage lenses, portions of the first coherent light and the second coherent light entered the telecentric system projecting to the two front stage lenses, respectively, and focusing on a same focus plane.

7. The hologram fabricating apparatus of claim 6, wherein the telecentric system further includes a rear stage lens located between the focus plane and the photoresist sheet to transform the portion of the first coherent light and the second coherent light focusing on the focus plane to parallel light and re-converge on the photoresist sheet to generate the interference stripes.

8. The hologram fabricating apparatus of claim 1 further including two spatial filters located between the coherent light generator and the two micro-display devices to evenly project the first coherent light and the second coherent light to the two micro-display devices.

9. The hologram fabricating apparatus of claim 1, wherein the two micro-display devices are symmetrical to the direction of a central axis of the telecentric system.

10. A method for fabricating hologram by producing interference stripes on a photoresist sheet through a hologram fabricating apparatus, the hologram fabricating apparatus including two micro-display devices and a telecentric system, each of the micro-display devices having a plurality of pixel elements laid thereon to control exposing position of the photoresist sheet, the telecentric system being located between the two micro-display devices and the photoresist sheet to converge light to generate the interference stripes, the method comprising the steps of:

grouping pixels to be formed on the photoresist sheet according to the direction and interval of the interference stripes to be fabricated;

adjusting the pixel elements on the two micro-display devices with respect to the pixels of the same group simultaneously based on the grouping result;

adjusting the interval of the two micro-display devices and the rotational angle relative to the photoresist sheet to determine the direction and interval of the interference stripes; and providing two coherent lights to project respectively to the two micro-display devices, and recording the pixels of the same group on the photoresist sheet at one exposing process.

11. The method of claim 10, wherein, whether the coherent light projected to the pixel elements also projects to the telecentric system is determined by means of reflection.

12. The method of claim 10, wherein, whether the coherent light projected to the pixel elements also projects to the telecentric system is determined by adjusting the light transmission of the pixel elements.

* * * * *